US009996854B2

(12) United States Patent
Crow et al.

(10) Patent No.: US 9,996,854 B2
(45) Date of Patent: Jun. 12, 2018

(54) HIERARCHICAL SYSTEMS, APPARATUS AND METHODS FOR DISPLAYING CONTEXT-AWARE CONTENT

(71) Applicant: Aerva, Inc., Cambridge, MA (US)

(72) Inventors: David Crow, Blemont, MA (US); Sanjay Manandhar, Cambridge, MA (US)

(73) Assignee: AERVA, INC., Cambridge, MA (US)

( * ) Notice: Subject to any disclaimer, the term of this patent is extended or adjusted under 35 U.S.C. 154(b) by 480 days.

(21) Appl. No.: 13/930,064

(22) Filed: Jun. 28, 2013

(65) Prior Publication Data

US 2015/0154633 A1 Jun. 4, 2015

(51) Int. Cl.
*G06Q 30/02* (2012.01)

(52) U.S. Cl.
CPC ......... *G06Q 30/0251* (2013.01); *G06Q 30/02* (2013.01); *G06Q 30/0277* (2013.01)

(58) Field of Classification Search
CPC ............... G06Q 30/02; G06Q 30/0277; G06Q 30/0251; G06Q 30/0267; G06Q 30/0269
See application file for complete search history.

(56) References Cited

U.S. PATENT DOCUMENTS

| 6,067,582 | A * | 5/2000 | Smith ........................ G06F 8/65 709/203 |
| 6,341,668 | B1 | 1/2002 | Fayette et al. |
| 6,856,989 | B1 * | 2/2005 | Zhou ................. G06F 17/30893 707/999.009 |
| 7,136,906 | B2 | 11/2006 | Giacalone, Jr. |
| 7,152,040 | B1 * | 12/2006 | Hawthorne .......... G06Q 10/087 705/14.1 |
| 8,229,458 | B2 | 7/2012 | Busch |
| 8,615,565 | B2 | 12/2013 | Randall |

(Continued)

FOREIGN PATENT DOCUMENTS

| IE | S83321 | 2/2004 |
| WO | 2004/010682 A2 | 1/2004 |

(Continued)

OTHER PUBLICATIONS

International Search Report and Written Opinion for Application No. PCT/US14/43871, dated Apr. 13, 2015, (10 pages).

(Continued)

*Primary Examiner* — Vincent M Cao
(74) *Attorney, Agent, or Firm* — Nutter McClennen & Fish LLP; David J. Powsner; Derek P. Roller (57) ABSTRACT

The invention provides in some aspects a system for display of context-aware content that includes a server storing context-sensitive data, a player that is persistently or, at least intermittently, coupled to the server, and that is likewise coupled to a plurality of output devices—such as, for example, electronic shelf labels, personal digital assistants, mobile phones, and LCD, LED or other fixed displays. The player responds to the context of each of the plurality of output devices by obtaining from the server data germane to that context, storing that data or content germane to that context generated from that data, and driving that content to that output device for presentation thereon, wherein the player concurrently drives different content to at least two of said output devices.

27 Claims, 3 Drawing Sheets

(56) References Cited

U.S. PATENT DOCUMENTS

| | | | |
|---|---|---|---|
| 8,683,340 B2 | 3/2014 | Wilkins | |
| 8,886,759 B2 | 11/2014 | Randall et al. | |
| 2004/0054577 A1* | 3/2004 | Inoue | G06Q 30/02 705/14.56 |
| 2004/0165006 A1 | 8/2004 | Kirby et al. | |
| 2004/0259553 A1 | 12/2004 | Delaney et al. | |
| 2005/0144066 A1* | 6/2005 | Cope | G06Q 30/02 705/14.25 |
| 2007/0022005 A1 | 1/2007 | Hanna | |
| 2007/0061204 A1* | 3/2007 | Ellis | G06Q 30/02 705/14.61 |
| 2007/0078706 A1* | 4/2007 | Datta | G06Q 30/02 705/14.5 |
| 2007/0100698 A1* | 5/2007 | Neiman | G06Q 30/02 705/14.46 |
| 2007/0101361 A1 | 5/2007 | Spielman et al. | |
| 2007/0271579 A1 | 11/2007 | Harris et al. | |
| 2007/0294096 A1 | 12/2007 | Randall et al. | |
| 2008/0033795 A1 | 2/2008 | Wishnow et al. | |
| 2008/0263467 A1 | 10/2008 | Wilkins | |
| 2009/0106082 A1 | 4/2009 | Senti et al. | |
| 2009/0144157 A1 | 6/2009 | Saracino et al. | |
| 2009/0171790 A1* | 7/2009 | Nagarajayya | G06Q 30/02 705/14.61 |
| 2009/0199230 A1* | 8/2009 | Kumar | G06Q 30/02 725/32 |
| 2009/0254824 A1 | 10/2009 | Singh | |
| 2010/0020752 A1 | 1/2010 | Anschutz et al. | |
| 2010/0064007 A1 | 3/2010 | Randall | |
| 2010/0118200 A1 | 5/2010 | Gelman et al. | |
| 2010/0169059 A1* | 7/2010 | Thomas-Lepore | G06F 17/50 703/1 |
| 2011/0010732 A1* | 1/2011 | Opdycke | G06Q 30/02 725/10 |
| 2011/0106626 A1* | 5/2011 | Zender | G06Q 30/02 705/14.64 |
| 2011/0166925 A1 | 7/2011 | Khare et al. | |
| 2011/0241843 A1 | 10/2011 | Marsanne et al. | |
| 2011/0302026 A1 | 12/2011 | Kanakarajan et al. | |

FOREIGN PATENT DOCUMENTS

| | | |
|---|---|---|
| WO | 2006/052837 A2 | 5/2006 |
| WO | 2009/057149 A2 | 5/2009 |

OTHER PUBLICATIONS

[No Author Listed] AerChannel Quick Setup Guide Version 1.0. Aerva, Inc., Publication Date Unknown, 2 pages.

[No Author Listed] AerChannel User Guide Version 33. Aerva, Inc., Jan. 16, 2006, 42 pages.

[No Author Listed] Aerchannel User Manual Version 3.7.16. Aerva, Inc., 2006-2007, 32 pages.

[No Author Listed] Digital Signage Provides Boston University School of Law with a Modern Communication System. Case Study: Boston University. NGAGE, Image Centre Group, Publication Date Unknown, 5 pages.

[No Author Listed] Event Planner's Guide to Setting Up Wiffiti, The. The Web Outside. May 7, 2009, 6 pages.

[No Author Listed] G-Channel/Network Manager. Installation and Setup: G-Channel Network Manager. Harris Broadcast Communications Division, Leitch Technology International Inc., 2007, 49 pages.

[No Author Listed] Getting a Custom 'Loca'—With a Side of Paul McCartney. Published Oct. 9, 2009, 1 page. Retrieved from <http://theweboutside.com>.

[No Author Listed] Harris® InfoCaster™ User Guide. Leitch Tecnology International, Inc., 2004-2006, 228 pages.

[No Author Listed] Harris® InfoCaster™ User Guide. Harris Canada Systems, Inc., 2004-2007, 228 pages.

[No Author Listed] Harris® InfoCaster™ User Guide. Harris Canada Systems, Inc., 2007, 294 pages.

[No Author Listed] How to optimize Microsoft Access when using ODBC data sources. Microsoft Corporation, last reviewed Mar. 26, 2007, Revision 7.1, 2 pages. Retrieved on Sep. 3, 2014 from <http://support.microsoft.com/kb/286222>.

[No Author Listed] InfoCaster™ Digital Signage Solution. Harris Corporation, 2008, 8 pages.

[No Author Listed] InfoCaster Installation Guide. Harris Canada Systems, Inc., 2004-2007, 82 pages.

[No Author Listed] InfoCaster/Network Manager. Installation and Setup: Infocaster Network Manager. Harris Broadcast Communications Division, Leitch Technology International Inc., 2007, 53 pages.

[No Author Listed] infocaster network manager™. Inscriber®. Inscriber Technology Corporation, Publication Date Unknown, 2 pages.

[No Author Listed] InfoCaster ODBC Configuration Help. Message board post. Imagine Communications Forums, Imagine Communications, Posted Apr. 8, 2004, 3 pages.

[No Author Listed] Insriber InfoCaster. Information Channel Creation Tool. Inscriber Technology Corporation, Publication Date Unknown, 6 pages.

[No Author Listed] Inscriber Network Manager. Leitch Technology International, Inc., 2003-2005, 142 pages.

[No Author Listed] Learn More About Wiffiti. Wiffiti. LocaModa, Inc. Retrieved using Wayback Machine for <http://www.wiffiti.com/learn>, as archived on Jul. 6, 2007, 2 pages.

[No Author Listed] LocaModa. LocaModa, Inc. Retrieved using Wayback Machine for <http://www.locamoda.com/technology/diagram.php?media=diagram-tech.gif>, as archived on Jul. 6, 2007, 1 page.

[No Author Listed] LocaModa Platform, The. LocaModa, Inc. Retrieved using Wayback Machine for <http://www.locamoda.com/technology/index.php>, as archived Jul. 6, 2007, 2 pages.

[No Author Listed] LocaModa Solution, The. LocaModa, Inc. Retrieved using Wayback Machine for <http://locamoda.com/technology/solution.php>, as archived on Aug. 31, 2007, 2 pages.

[No Author Listed] m-Venue Turns Mobile into Jukebox Remote. Marketing Vox, Jul. 26, 2007, 2 pages.

[No Author Listed] Massanutten Resort. Inscriber InfoCaster Keeps Massanutten Resort Guests Busy. Customer Profile. Inscriber Technology Corporation, Publication Date Unknown, 2 pages.

[No Author Listed] Network Manager 3.0. Release Notes. Harris Broadcast Communications Division, Leitch Technology International, Inc., 2004-2007, 2 pages.

[No Author Listed] Release Notes for Cisco Digital Media System 4.0, May 17, 2007, Cisco Systems, Inc., 10 pages.

[No Author Listed] Release Notes for Cisco Digital Media System 4.1, Apr. 23, 2008, Cisco Systems, Inc., 20 pages.

[No Author Listed] RF Serial Port Manager. Use the RF Serial Port Manager. Inscriber®, Leitch Technology International Inc., 2004, 2005, 6 pages.

[No Author Listed] Set Up External Triggers in InfoCaster. Harris Broadcast Communications Division, Harris Canada Systems, Inc., 2004-2007, 8 pages.

[No Author Listed] Support. InfoCaster Upgrades. Harris Corporation. Retrieved using Wayback Machine for <http://www.infocaster.tv/Support/index.html>, as archived on Jan. 13, 2008, 1 page.

[No Author Listed] Text Crawl with an ODBC source. Message board post. Imagine Communications Forums, Imagine Communications, Posted Dec. 22, 2003, 3 pages.

[No Author Listed] Text to YearlyKos. Wiffiti. LocaModa, Inc. Retrieved using WaybackMachine for <http://withti.com/a/ykos>, as archived on Sep. 23, 2007, 2 pages.

[No Author Liisted] Top of Our Radar: Harris Corporation Introduces InfoCaster™ 3.0 and Network Manager 3.0. Machine2Machine Evolution, M2 Communications Ltd., Jun. 20, 2007, 5 pages.

[No Author Listed] txt out loud, the blog about Wiffiti: Everything about the Wiffiti network. LocaMida, Inc. Retrieved using Wayback Machine for <http://www.wiffiti.com/txtoutloud/?page_id=5>, as archived on Jul. 6, 2007, 1 page.

(56) References Cited

OTHER PUBLICATIONS

[No Author Listed] User Guide for Cisco Digital Media Manager 4.0, Jun. 19, 2007, Cisco Systems, Inc., 102 pages.

[No Author Listed] User Guide for Cisco Digital Media Manager 4.1, Apr. 29, 2008, Cisco Systems, Inc., 128 pages.

[No Author Listed] Using DMM-DSM for digital signage. User Guide for Cisco Digital Media Manager 4.1, Chapter 3, Oct. 22, 2007, Cisco Systems, Inc., 31 pages.

[No Author Listed] Where to get rss & xml. Message board post. Imagine Communications Forums, Imagine Communications, Posted Dec. 29, 2004, 3 pages.

[No Author Listed] Wiffitti Sightings. Wiffitti. LocaModa, Inc. Retrieved using Wayback Machine for <http://www.wiffiti.com/learn/sightings.php>, as archived on Jul. 6, 2007, 2 pages.

English, D., Harris InfoCaster 2.0. Get the Message! StudioDaily, Access Intelligence, LLC, Jun. 1, 2006, 3 pages.

Gerba, B., Syndicating content to your kiosk or digital sign network. The Digital Signage Insider. Wirespring Technologies, Inc. May 5, 2005, 2 pages.

Haynes, D., Akoo bridges digital and cell phone screens. Sixteen:Nine, Vertical Media Consulting Group Inc., =Feb. 25, 2008, 7 pages.

Sauer, J., Inscriber InfoCaster 2.0. Powerful digital software handles many tasks. Sound & Video Contractor, VewBay Media, LLC, Apr. 1, 2006, 3 pages.

Schrank, S., Akoo's m-Venue Lets Mobiles Connect to TV Screens. Social Times, Mediabistro Inc., Feb. 25, 2008, 4 pages.

Yackey, B., DSE: the year of digital signage. Digital Signage Today, Networld Media Group, Mar. 4, 2008, 12 pages.

Alves, P., et al., "Distributed Context-Aware Systems," May 31, 2011 (May 31, 2011), XP055316252, Retrieved from the Internet: <http://www.gsd.inesc-id.pt/-palves/publications/TR-inesc-Distributed-ContextAware-Systems.pdf> [retrieved on Mar. 11, 2016].

Extended European Search Report dated Nov. 16, 2016, for Application No. 14817809.8 (7 pages).

\* cited by examiner

HIERARCHICAL SYSTEMS, APPARATUS AND METHODS FOR DISPLAYING CONTEXT-AWARE CONTENT

BACKGROUND OF THE INVENTION

The invention pertains to digital data processing and, more particularly, for example, to multimedia digital data distribution. It has application, by way of nonlimiting example, to the automated distribution of advertising, digital shelf labeling and other digital signage.

Signage is at least as old as business. Whether it dates back to the advent of the world's oldest profession is a topic for another day. According to the Oxford English Dictionary, the term signage generally refers to commercial signs, that is, commercial marks, notices, etc., that convey information or instructions. The word has a rich etymology that indicates Middle English, Anglo-Norman, Old French, Middle French roots and that lends credence to the Wikipedia history of signage, suggesting that the ancient Egyptians and Romans used signs, and that King Richard II compelled taverns to employ them to facilitate inspections by the local authorities.

Initially, carved into stone, tree trunks and other fixed objects, signage has largely been a form of printed media since the advent of lithography and other, more modern printing techniques. Printed signage is a regular part of most of our lives; it is difficult to get through a day in modern industrial society without seeing tens if not hundreds of signs.

Though the term dates long back, signage as a field is anything but static. As the cost of natural resources rises and the world becomes more digitally "connected," paper-based signs are giving way to digital signage at an ever-increasing rate. One industry research association estimates that the number of installed digital signage sites will grow threefold, from somewhat over 0.5 million to 1.5 million sites by the end of the decade, with annual revenues growing at an average of almost 15% to almost $7 billion, globally.

While a boon to digital sign makers, content creators, network operators, and media buyers, alike, the growth of digital signage is not entirely welcome by those who should benefit from it the most—retailers and advertisers. Digital signs can, in the most egregious of instances, be more difficult to use and maintain then their paper counterparts, not to mention many times more expensive.

One company whose products have bucked the trend in this regard is the assignee hereof. Founded in 2005, Aerva provides real-time interactivity between mobile, social media applications and digital display networks. Its AerWave product is a web-based platform for managing and scheduling content on networked displays, with integration for social media, real-time data feeds, and mobile interactivity. It features robust content management, easy scheduling, and a powerful network operations system that is served from the "cloud."

Notwithstanding advances introduced by Aerva and others in the field, there remains room for improvement to further enhance the usability, increase the flexibility and reduce the costs associated with digital signage systems, particularly, as their reach extends into the marketplace and encompasses a wider range of form factors, from billboards to storefront signs to electronic shelf labels (ESLs). Such is among the objects of the invention.

Other objects of invention include providing improved systems, apparatus and methods for digital data processing.

Still other objects of the invention include providing such systems, apparatus and methods as are applicable to multimedia digital data distribution.

Yet still other objects of the invention include providing such systems, apparatus and methods as are applicable to shelf labels, advertising and other digital signage.

SUMMARY OF THE INVENTION

The foregoing are among the objects attained by the invention, which provides in some aspects a system for display of context-aware content that includes a server storing context-sensitive data, a player that is persistently or, at least intermittently, coupled to the server, and that is likewise coupled to a plurality of output devices—such as, for example, electronic shelf labels, personal digital assistants, mobile phones, and LCD, LED or other fixed displays. The player responds to the context of each of the plurality of output devices by obtaining from the server data germane to that context, storing that data or content germane to that context generated from that data, and driving that content to that output device for presentation thereon, wherein the player concurrently drives different content to at least two of the output devices.

Related aspects of the invention provide a system, e.g., as described above, in which the data includes any of static media files, dynamic media and raw data. In further related aspects, the player drives content to one or more of the output devices by serving or rendering such files, media or raw data.

Other related aspects of the invention provide a system, e.g., as described above, in which the context includes one or more of the identity of an output device, the identity of an owner of an output device, the absolute or relative location of an output device, the time at that location in absolute or relative terms, the type of an output device, display or other properties of an output device, and an environment in which an output device is disposed—all by way of nonlimiting example.

Still other related aspects of the invention provide a system, e.g., as described above, in which the player senses the context of an output device. Alternatively, or in addition, in accord with other related aspects of the invention, at least one of the output devices transmits to the player a signal indicative of the context of that output device.

Yet still other aspects of the invention provide a system, e.g., as described above, in which the server stores presentation rules for the context-sensitive data, and in which the player drives content germane to a context of each output device as function of those presentation rules. Those rules can be, for example, time-based and/or location-based.

In still other related aspects, the invention provides a system, e.g., as described above, in which the player discards data germane to an output device when its (the player's) coupling with that output device is discontinued, e.g., as when the output device is moved.

Other aspects of the invention provide a system, e.g., as described above, that includes a plurality of players, a first one of which is at least intermittently coupled to the server and to a set of output devices. A first one of those players discards data germane to each of a subset of the output devices upon discontinuance of at least intermittent coupling with them (i.e., that subset), and a second one of the players which comes into contact with one of the output devices in that subset responds to a context of that output device by obtaining from the server data germane to that context, storing that data or content germane to that context generated from that data, and driving that content to that output device for presentation thereon. In a system according to these aspects of the invention, the player concurrently drives different content to at least two of the output devices.

Related aspects of the invention provide a system, e.g., as described above, in which the set of output devices comprises a plurality of electronic shelf labels. In other related aspects, the set of output devices comprises any of personal digital assistants, mobile phones, and LCD, LED or other fixed displays.

Other aspects of the invention provide servers, players and output devices adapted for use in systems of the type described above.

Still other aspects of the invention provide methods of operating such systems and apparatus paralleling that described above.

These and other aspects of the invention are evident in the text that follows and in the drawings.

BRIEF DESCRIPTION OF THE ILLUSTRATED EMBODIMENT

A more complete understanding of the invention maybe attained by reference to the drawings, in which.

DETAILED DESCRIPTION OF THE ILLUSTRATED EMBODIMENT

System Architecture

Figure 1:
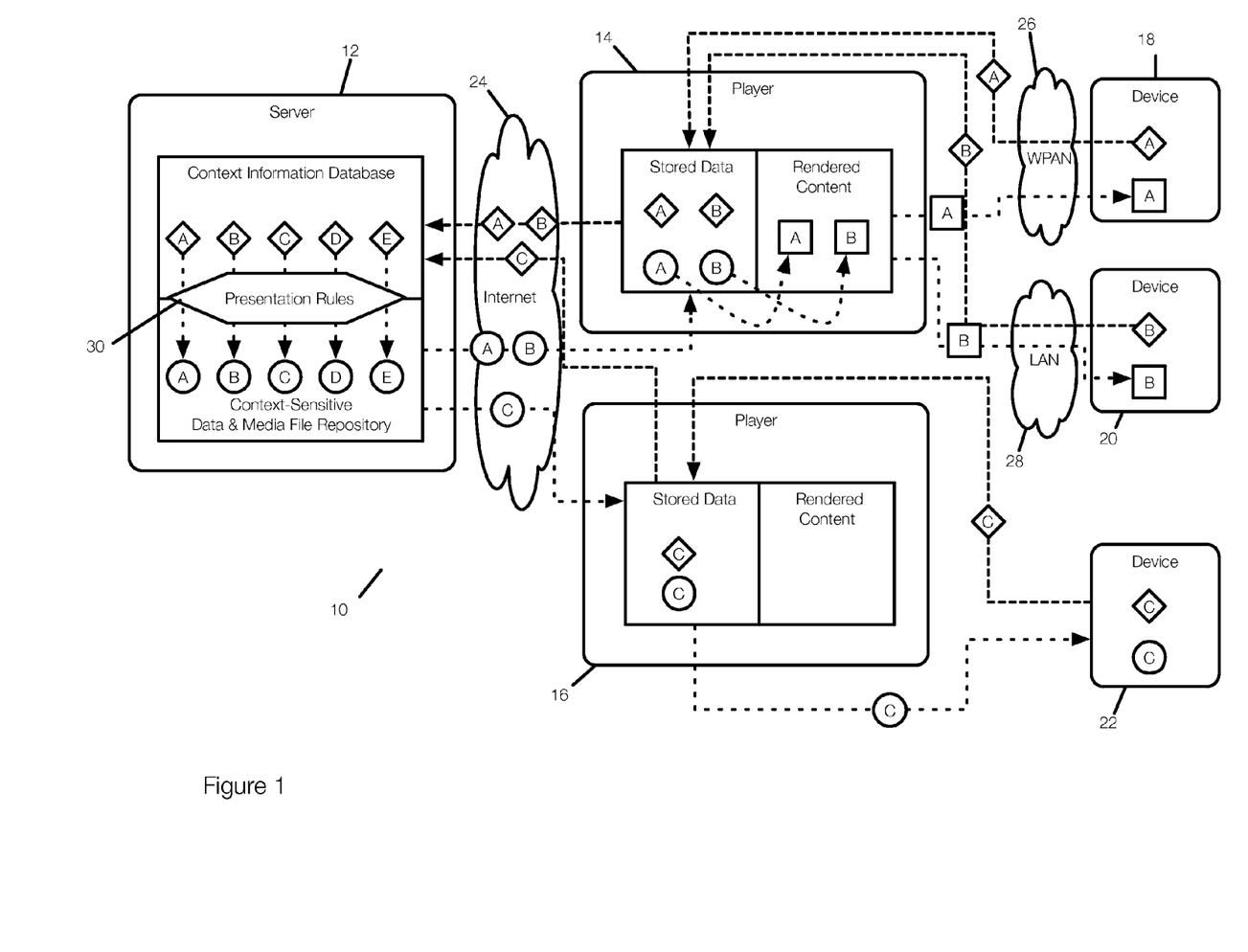
FIG. 1 depicts a hierarchical system for display of context-aware content according to one practice of the invention.

FIG. 1 depicts a system 10 for display of context-aware content according to one practice of the invention including a server 12, players 14, 16, and output devices 18-22, coupled for communications, e.g., by networks 24-28, as shown.

Server 12 stores multimedia data to be selectively presented on the output devices 18-22, as well as rules governing the context(s) in which that data is to be presented on those devices 18-22. The server 12 comprises digital data processing apparatus of the type commercially available in the marketplace, such as, for example, a mainframe computer, minicomputer, workstation, desktop computer, or other data processing device, as adapted in accord with the teachings hereof. Though, the illustrated server 12 is depicted as a single device, in other embodiments it may comprises one or more such devices, physical or virtual.

Players 14-16 store and/or relay multimedia data from the server 12 to the respective output devices 18-22 to which those players are connected. The players 14-16 likewise store and/or relay context information from those respective output devices 18-22 to server 12. Like server 12, players 14-16 can comprise mainframe computers, minicomputers, workstations, desktop computers, or other data processing devices, again, as adapted in accord with the teachings hereof. And, though only two players 14, 16 are shown in the drawing, each comprising a single device, other embodiments may utilize still more players, each comprising one or more devices, physical or virtual.

Output devices 18-22 present context-sensitive data (or renderings of such data) supplied to them by the respective players 14 to which they are coupled. In the illustrated embodiment, output devices 18-20 comprise conventional electronic shelf labels (ESLs) and output device 22 comprises a conventional LCD display, all as adapted in accord with the teachings hereof. In other embodiments, output devices 18-22 comprise any of a variety of digital data devices (desktop computers, tablet computers, smart phones, personal digital assistants, MP3 players, etc.), digital signage, LCD displays, and other conventional devices of the type commercially available in the marketplace suitable for visual, audio or other presentation of information—again, as adapted in accord with the teachings hereof.

Networks 24-28 comprise communications media of the type known in the art, including, for example, the Internet, LANs, WANs, cell phone networks, landline-based networks, and so forth, all as adapted in accord with the teaching hereof. Though illustrated here, by way of example, as an Internet 24, a WPAN 26, and LAN 28, it will be appreciated that a variety of other communications media (e.g., WiFi) can be used instead or in addition. Regardless, those networks 24-28 and their respective media provide at least intermittent coupling between and among connected ones of the respective devices 12-22. For example, in some embodiments, the server 12 is persistently coupled to players 14, 16 which, in turn, maybe persistently coupled to some output devices and only intermittently coupled to other output devices (e.g., portable output devices that may come into and go out of range of the players, e.g., as the owners of those portable devices move about).

Together, devices 12-22 and networks 24-28 form a hierarchical device network (referred to below as the "device network," or the like) having server 12 as a base node, output devices 18-22 as leaf nodes, and players 14-16 (and other nodes intermediate to the server 12 and output devices 18-22) as branch nodes.

Output Device Contexts

Output devices 18-22 are each associated with one or more contexts. These can include, for example, an identity of the respective device, an identity of an owner of that device, an absolute or relative location of the device, the time at that location in absolute or relative terms, a type of the device, one or more presentation or other capabilities of the device, and an environment in which the output device is disposed, all by way of non-limiting example. As used here, "owner" refers to an owner of information presented by the device, an operator of the device, a legal owner of the device, or other entity the identity of which may inform the selection of data to be presented on the device.

The aforesaid contexts are embodied in records, files and/or other data structures (hereinafter, "context-indicative data") suitable for storage on the respective output devices 18-22, as well as on (in many instances) the players 14, 16 and/or server 12 to which they are directly or indirectly coupled. Context-indicative data are represented in the drawing as diamonds. This includes context-indicative data represented by the diamond labelled "A" (or "Context A," for short) embodying context information for device 18; context-indicative data represented by the diamond labelled "B" ("Context B") embodying context information for device 20; and context-indicative data represented by the diamond labelled "C" ("Context C") embodying context information for device 18. This also includes context-indicative data represented by the diamonds labelled "D" and "E" embodying context information for other devices (not shown). Although only a single context-sensitive datum is shown with each of devices 18-22 in the drawing, it will be appreciated that (i) each such datum can represent a plurality of contexts associated with the respective device, and/or (ii) multiple such data can be associated with that device. For simplicity, in the discussion that follows, each datum (i.e., Context A, Context B and Context C) are each assumed to represent a plurality of contexts for the respective device.

The context-indicative data associated with each device 18-22 can be self-generated by the respective device (e.g., in connection with the use of sensors or otherwise) and/or maintained by the device (regardless of whether self-generated). Thus, for example, each of Contexts A-C can reflect MAC address, IP addresses and other hardware- and/or addressing-specific information for the respective devices assigned to the them "at the factory" and/or by players 14-16, server 12 or other "upstream" devices within respective branches of the device network. Likewise, one or more of Contexts A-C can reflect jumper or other switch settings that are made to the respective devices, e.g., at installation and that reflect, for example, their presentation capabilities. Still further, one or more of Contexts A-C can reflect ambient temperatures, geolocation information, ambient network signal strength, and other conditions reflecting "operational" conditions of the respective devices, e.g., as sensed by on-board sensors or otherwise.

In the illustrated embodiment, output devices 18-22 transmit some or all of their respective context-indicative data, here, Contexts A-C, respectively, to the players 14-16 to which they are respectively directly coupled for storage by those players, e.g., in on-board (or other) tables, databases and/or other data stores (not shown). And, those players, in turn, transmit that data to server 12 for storage there, again, for example, in on-board (or other) tables, databases and other data stores (not shown).

As a consequence, in the illustrated embodiment, the context-indicative data Contexts A-C are stored not only within the respective output devices 18-22, but also in the server 12 and branch nodes (e.g., players 14-16) intermediate thereto in the device network hierarchy. The context-sensitive data can be propagated upstream within those branches (i.e., from the output devices 18-22 to the respective players 14-16 and, from them to the server 12, and so forth), utilizing conventional data transmission techniques known in the art, e.g., transmission upon power-up, at regular intervals, upon being polled, or otherwise, via TCP with SSL, HTTPS, or other protocols and/or techniques.

Although in the illustrated embodiment, context-indicative data is maintained on respective output devices 18-22, as well as on the other nodes of respective branches of the device network of which each of those devices 18-22 forms a part, in other embodiments, the output devices 18-22 may, for example, generate but not maintain some or all of their own respective context-indicative data themselves. Likewise, in some embodiments, the players 14-16 may relay to server 12 context-indicative data received from the output devices 18-22 in the respective branch of the device network, but not maintain that context-indicative data themselves. Still further, in some embodiments, the server 12 may maintain only a portion of the context-indicative data received from the output devices 18-22 via the players 14, 16.

Moreover, although in the illustrated embodiment, the context-indicative data is indicative of the context of the illustrated output devices 18-22, in other embodiments additional context-indicative data may be generated and/or maintained by the players 14, 16, server 12 and/or other nodes in the device network that is indicative of the contexts of those respective nodes. In the case of players 14, 16, such additional context-indicative data can be propagated by them to "higher" nodes in respective branches of the device network, here, to server 12. Examples of such additional context-indicative data are data reflecting an aggregate count, population, or "output density" of output devices attached to a given player 14, 16 (or otherwise "beneath" it in the respective branch of the device network), an identity of a common owner of those output devices, an indication of a common location of those output devices, and so forth.

Context-Sensitive Data

Context-sensitive data, e.g., stored on server 12 for selective presentation on the output devices 18-22 (in accord with their respective contexts), can comprise multimedia data such as, for example, static media (e.g., HTML or other text data, and JPEG or other image data), dynamic media (e.g., video and other moving picture data and audio data) and raw data (e.g., unformatted data), by way of example. In the illustrated embodiment, the aforesaid context-sensitive data are typically embodied in files (e.g., HTML, TXT, JPEG, and MOV files, by way of nonlimiting example) and/or records or other data structures (hereinafter, "context-sensitive data" or, without loss of generality, "context-sensitive data files") suitable for (i) presentation and/or rendering for presentation on the respective output devices 18-22, and, (ii) for storage on the at least the immediate upstream nodes (here, players 14, 16) of respective branches of the device network of which each of those devices 18-22 forms a part. In some embodiments, that data is not necessarily suitable for storage on those upstream nodes but, rather, is merely suitable for presentation and/or rendering for presentation on the output devices 18-22 themselves.

In a typical embodiment supporting the display of advertising on digital billboards, digital placards or other fixed displays, the context-sensitive data comprise HTML and related still image files, all by way of nonlimiting example. In another typical embodiment supporting the display of advertising on personal digital assistants, mobile phones, laptop computers and other "smart" devices, the context-sensitive data files comprise Flash or HTML 5 and related still image, video and audio files, again, all by way of nonlimiting example. In yet another typical embodiment supporting the display of inventory and pricing data on electronic shelf labels, the context-sensitive data files comprise XML or other data files containing product identification and pricing information, yet again, by way of nonlimiting example.

Context-sensitive data is represented in the drawing by circles. This includes context-sensitive data represented by the circle labelled "A" (or "Context-Sensitive Data A," for short) embodying multimedia or other data destined for presentation on device 18; context-sensitive data represented by the circle labelled "B" ("Context-Sensitive Data B") embodying multimedia or other data destined for presentation on device 20; and context-sensitive data represented by the circle labelled "C" ("Context-Sensitive Data C") embodying multimedia or other data destined for presentation on device 22. This also includes context-sensitive data represented by the circled labelled "D" and "E" embodying multimedia or other data destined for presentation on other devices (not shown).

Although only a single context-sensitive data file is shown associated with each of devices 18-22 in the drawing, it will be appreciated that (i) each such file can represent a plurality of context-sensitive data files destined for presentation on the respective device, and/or (ii) multiple such context-sensitive data files can be associated with that device. For simplicity, in the discussion that follows, each data file (i.e., Context-Sensitive Data A, Context-Sensitive Data B and Context-Sensitive Data C) are each assumed to represent a plurality of context-sensitive data files destined for presentation on the respective device.

More particularly, in the illustrated embodiment, server 12 transmits downstream some or all of the context-sensitive data destined for presentation on the respective output devices 18-22 (here, Context-Sensitive Data A-C, respectively) to players 14-16 upstream of those respective output devices 18-22 in the aforementioned device network for storage by those players, e.g., in on-board data stores (not shown). The players, in turn, transmit that context-sensitive data downstream to the respective output devices 18-22 for storing, rendering and presentation by them. This is shown in the drawing, by way of example, for Context-Sensitive Data C, which is shown as transmitted from server 12 to player 16 and, in turn, to output device 22, from which it is rendered and displayed.

Alternatively or in addition, the players can render the context sensitive data received by them from the server 12 (or other upstream device) and transmit the rendered result to the respective output devices for storage and/or presentation. This is shown in the drawing, by way of example, for Context-Sensitive Data A and Context-Sensitive Data B, both of which are shown as transmitted from server 12 to player 14, rendered by player 14 and transmitted to output devices 18, 20, respectively for presentation by them.

The context-sensitive data and/or renderings thereof can be propagated downstream within branches of the device network (i.e., from the server 12 to output devices 18-22 via players 14, 16), utilizing conventional data transmission techniques known in the art, e.g., TCP with SSL, HTTPS, or other protocols and/or techniques.

As shown in the drawing, in the illustrated embodiment, the context-sensitive data—here, Context-Sensitive Data A, Context-Sensitive Data B, and Context-Sensitive Data C—are stored not only within server 12 and the respective output devices 18-22, but also in the branch nodes (e.g., players 14-16) intermediate to those output devices in the device network hierarchy. In other embodiments, the branch nodes (e.g., players 14-16) may retain only a portion or none of the context-sensitive data.

In instances where the upstream players 14-16 render the context-sensitive data and pass it on to the respective downstream output devices 18-22, that rendering may be accomplished by converting data from the format in which it is received from the server 12 (or other upstream node in the device network) to a form suitable for display or other presentation on the respective output devices. Examples of such conversions include converting PDF, HTML and other files to text sequences; converting such files to raster or vector graphics; decoding MOV, MP3 and/or other audio/video files into formats suitable for the respective output devices; and so forth, all by way of nonlimiting example.

Presentation Rules

Server 12 stores rules 30, which can be embodied in on-board (or other) tables, databases and/or other data stores (not shown) of server 12, governing the context(s) under which multimedia and other data embodied in Context-Sensitive Data A-E is to be presented on output devices 18-22. Those rules 30 may specify contexts such as, by way of nonlimiting example, one or more of the following:

output device identity (e.g., globally unique device ID, MAC address, etc.);
output device owner identity (e.g., owner name, globally unique owner ID, etc.);
device location (e.g., globally unique location ID, IP address or address range, location of the nearest player 14, 16 to which the device is coupled, etc.);
time (e.g., local to output device, GMT, etc.);
output device type (e.g., "dumb" LCD display, smart phone, tablet computer, digital billboard, etc.);
presentation or other capabilities of the output device (e.g., audio, video resolution, refresh rate, vector/raster graphics, etc.);
rendering capabilities of nearest player 14, 16 which the device is coupled (e.g., audio, video resolution, refresh rate, vector/raster graphics, etc.); and/or
environment in which the output device is disposed (e.g., indoor, outdoor, public space, nearby businesses/facilities, aggregate count, population, or "output density" of output devices attached to the same player, etc.)

and/or combinations thereof, all by way of non-limiting example. As evident from the foregoing listing, the rules may specify contexts that embrace properties not only of the output devices but also of the player 14, 16 to which they may be coupled The rules 30 may, as well, specify the data to be presented in those contexts by way of reference to context-sensitive data, such as, by way of example, to one or more of Context-Sensitive Data A-E, portions thereof and/or combinations thereof.

Moreover, the rules may specify the output devices on which the data is to be presented. Specification of the output device may include output device identity, identity of the player to which the output device is coupled, and so forth. Depending upon specific implementation, specification of the output device may overlap specification of the context.

By way of example, rules 30 may specify directives of the type listed below. Of course, the encoding of such rules may vary by embodiment:

At 10 PM-12 AM (local time), present Context-Sensitive Data A on output device 18
Present Context-Sensitive Data C on all output devices that are coupled to player 16 and that have audio and video presentation capabilities
Present text from line 3 of Context-Sensitive Data D on the output device with ID #ESL-MENS-CALF-LENGTH-GOLDTOE-SOCKS
If (local) temperature is below 30° F. and output device is in communications coupling with player 14, present Context-Sensitive Data E Again, the foregoing are merely examples. It will be appreciated that actual rules may be simpler or more complex that those shown here. For example, in the latter regard, the rules may match not only contexts of the output devices but also of the data to be presented (e.g., "If the local forecast is for rain, present on any video-capable output device in the vicinity a trailer for a movie playing at a nearby theatre.")

Operation

In operation, context-sensitive data, e.g., Context-Sensitive Data AE, are loaded onto server 12 in the form of multimedia files or otherwise, by an administrator or other authorized user. The rules 30 are likewise loaded. Both the context-sensitive data and rules can be updated as the administrator (or other authorized user) sees fit. And, as noted above, context-indicative data is propagated from the output devices 18-22 and/or their respective associated players 14, 16 to server 12 upon power-up, at regular intervals, upon being polled, or otherwise.

A rules engine (not shown) of the type known in the art (as adapted in accord with the teachings hereof) executing on the processor of server 12 effectuates the rules 30. That engine, which may run continuously, periodically, episodically, or otherwise, compares context-indicative data, e.g., Contexts A-E, received by the server 12 from the players 14, 16 (and their associated output devices 18-22) against the rules to identify (a) context-indicative data matching the constraints specified in those rules, (b) context-sensitive data to be presented as a result of those matches, and (c) output devices on which to present that data as a result of those matches. The engine then transmits that identified context-sensitive data to the players 14, 16 for transmittal to the associated respective output devices 18-22 for presentation thereon and/or for rendering by those respective players and transmittal of the rendering to the associated respective output devices 18-22 for presentation.

The foregoing is reflected in the drawing, which depicts the transmittal of Context-Sensitive Data A and Context-Sensitive Data B from server 12 to player 14 via network 24 on matching a rule 30 and, in turn, (i) the rendering of Context-Sensitive Data A on that player 14 and its transmittal therefrom, via network 26, to output device 18 for presentation thereon; and, (ii) the rendering of Context-Sensitive Data B on that player 14 and its transmittal therefrom, via network 28, to output device 20 for presentation thereon. Similarly, the drawing depicts the transmittal of Context-Sensitive Data C from server 12 to player 16 via network 24 on matching a rule 30 and, in turn, its transmittal from that player 16 to output device 22 for rendering and presentation thereon.

Given differences in the contexts of the respective output devices 18-22, differences in the rules 30 that cause context-sensitive data to be driven to those devices, and/or differences among and between the data, themselves, a practical implication of operation of the system shown in FIG. 1 (and, likewise, in FIGS. 2 and 3) is that players 14, 16 concurrently are likely to drive (i.e., to transmit and/or render for transmittal) different context-sensitive data to the output devices 18-22 at any given time—and, moreover, that any one of those players, e.g., 14, is likely to drive different context-sensitive data to the output devices 18, 20 connected to it at any given time.

In some embodiments, the engine transmits to the players 14, 16, along with context-sensitive data, the rule 30 whose match resulted in that data transfer. Suitably-equipped players (e.g., players with suitable processing and storage capabilities) can, themselves, execute rules so received on their own respective rules engines (paralleling that discussed above executing on server 12) to (a) facilitate continuous presentation of the context-sensitive data on the respective output devices, e.g., in the event communications between the server 12 and the respective player are lost and/or (b) make changes to presentation of data on the respective output devices 18-22 in response to changing contexts (e.g., changes in local time, local weather, and so forth). In these regards, the server 12 can transmit to the players 14, 16 all of the rules 30 or, more typically, a subset of those rules likely to be needed by the respective player in the event of such communications loss or such a context change.

Among the changes in context that can be addressed by rules executing on the players 14, 16 (as well, of course, as by execution of those rules on server 12) is the discontinuance of coupling between a player and an output device, e.g., as where the latter ceases function or, more typically, as in the case of portable output devices (such as, smart phones, personal digital assistants, and so forth), as where the output device is disconnected from (in the case of wired connectivity) and/or moved outside the range of (in the case of wireless connectivity) the player. In such instances, the player that has lost connectivity with the output device can discard the context-sensitive data that it (the player) had received from the server 12 for transmittal and/or rendering on that output device, as well as the context-indicative data that player had received from the "disconnected" device. In some embodiments, the server 12 discards that data, as well.

Figure 2:
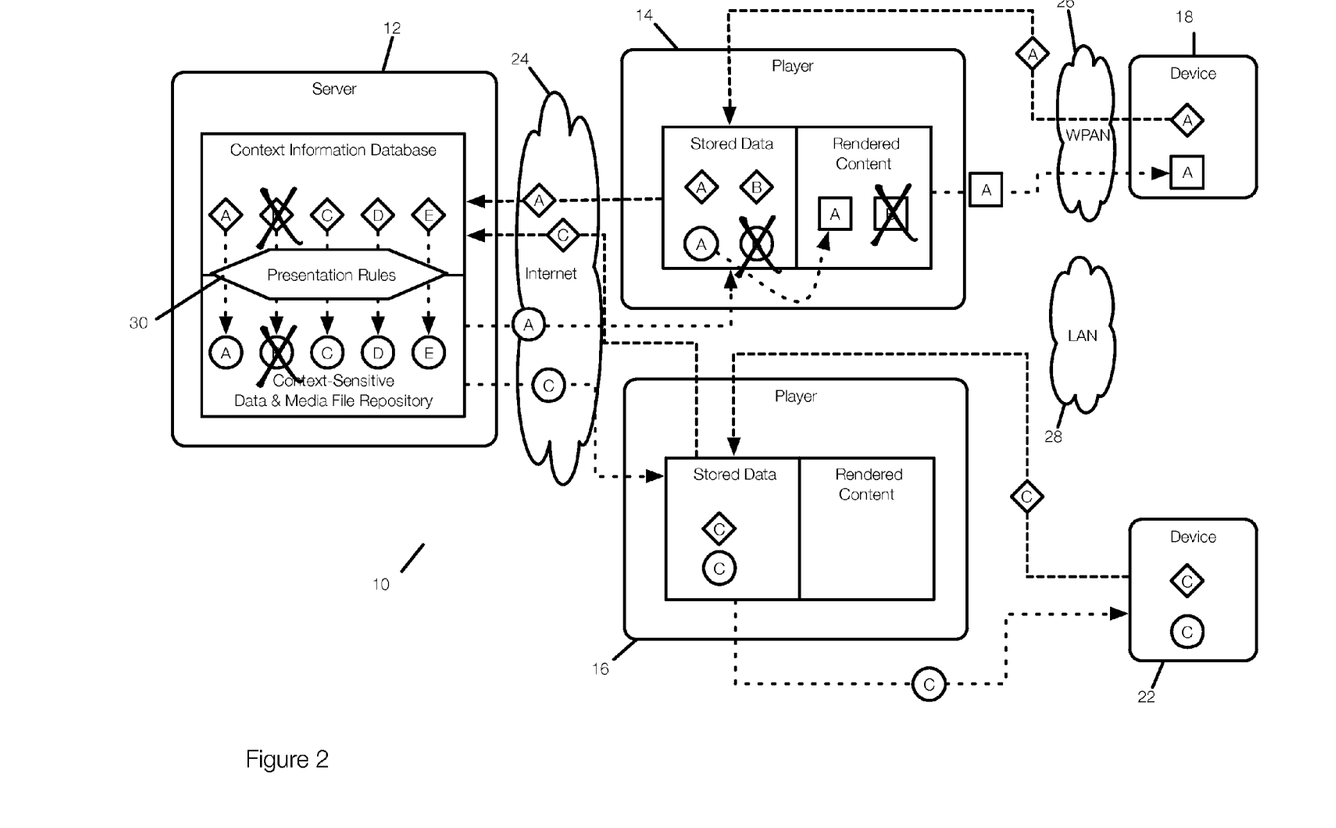
FIGS. 2 and 3 depict modes of operation of the system of FIG. 1.

An example of the foregoing is depicted in FIG. 2, which parallels FIG. 1, except insofar as it reflects disconnection of output device 20 from player 14 and the consequent discarding of context-indicative and context-sensitive data pertaining to that device from both that player and the server 12.

Another such change in context that can be addressed by rules executing on players 14, 16 (again, as well as by execution of those rules on server 12) is the new or renewed coupling between a player and an output device, e.g., as where the latter is activated or, more typically, as in the case of portable output devices, as where the output device is connected to (in the case of wired connectivity) and/or moved into the range of (in the case of wireless connectivity) the player. In such instances, context-indicative data is propagated from the (re)newly connected output devices and/or its respective associated player to server 12, as discussed above. And, as discussed above, the rules engine executing on server 12 can effectuate any rules pertaining to that output device and transmit the appropriate context-sensitive data to it, via the player to which it has (re)newly attached, along with any corresponding rules.

Figure 3:
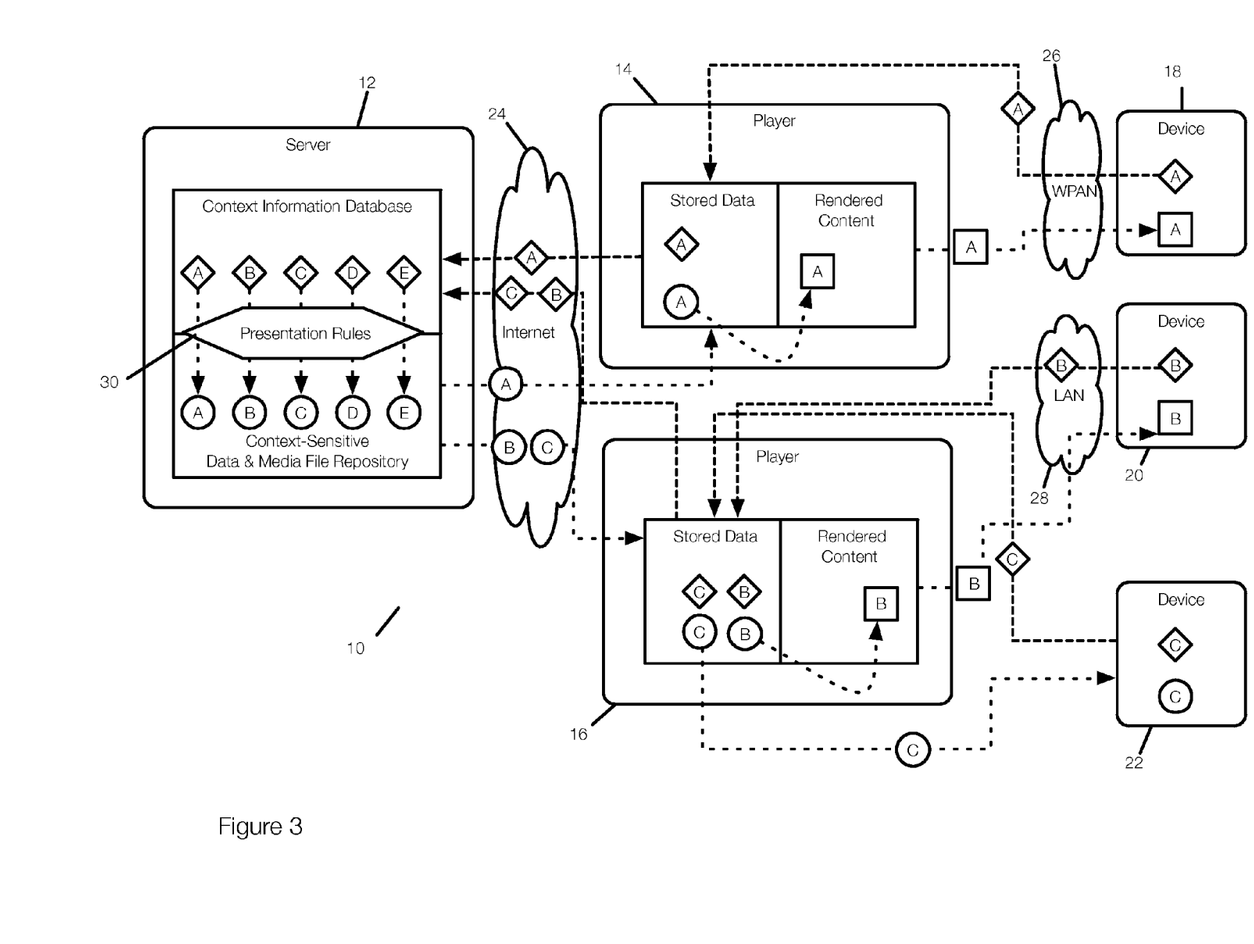

The foregoing is reflected in FIG. 3, which shows attachment of output device 20 to player 16, and the commensurate propagation of context-indicative and context-sensitive data up- and down-stream within the device network. More particularly that drawing shows propagation of context-indicative data, Context Data B, from the output device 20 via player 16 to server 12. That drawing also depicts transmittal of Context-Sensitive Data B from server 12 to player 16 via network 24 on matching a rule 30 and, in turn, the transmittal of Context-Sensitive Data B from that player 16 to output device 20 for presentation thereon.

Described above our systems, apparatus and methods meeting the objects set forth previously. It will be appreciated that the illustrated embodiment, shown and described herein, is merely an example of the invention and that other embodiments incorporating changes to those shown herein fall within the scope of the invention, as well.

In view thereof, what we claim is:

1. A system for display of context-aware content, comprising:
   A. a server that stores context-sensitive data,
   B. a plurality of players that are at least intermittently coupled to the server and to a plurality of output devices, each said output device having a respective context, each said player being equipped to (i) obtain from the server and store data germane to respective contexts of the output devices to which that player is coupled, (ii) render that obtained data to a form suitable for display on one or more of those output devices, and (iii) drive that obtained data to one or more of those output devices directly or indirectly through one or more other players;
   C. a first one of the players responding to a first context of a first output device by
      i) obtaining from the server first data or content germane to the first context,
      ii) storing the first data or content germane to the first context generated from the first data,
      iii) rendering the first data or content to a form suitable for display on the first output device, and
      iv) driving that rendered data or content to the first output device for presentation thereon;

D. the first player responding to a second context of a second output device by
   i) obtaining from the server second data or content germane to the second context,
   ii) storing the second data or content germane to the second context generated from the second data, and
   iii) driving the second data or content to the second output device via one or more others of the plurality of players concurrently with driving rendered first data or content to the first output device,
wherein the first data or content differs from the second data or content.

2. The system of claim 1, wherein data includes any of static media files, dynamic media and raw data.

3. The system of claim 1, wherein the context includes any of an identity of a said output device, an identity of an owner of a said output device, an absolute location of a said output device, a time at that location in absolute or relative terms, a relative location of a said output device, a type of a said output device, one or more properties of a said output device, an environment in which a said output device is disposed.

4. The system of claim 3, wherein the player senses a said context of a said output device.

5. The system of claim 4, wherein at least one of the output devices transmits to the player a signal indicative of the context of that output device.

6. The system of claim 1, wherein
A. the server stores presentation rules for the context-sensitive data, and
B. the player drives content germane to a context of a said output device as function of those presentation rules.

7. The system of claim 6, wherein the presentation rules include any of time-based rules and location-based rules.

8. The system of claim 1, wherein the output devices include any of electronic shelf labels, personal digital assistants, mobile phones, and LCD, LED or other fixed displays.

9. The system of claim 1, wherein the server is coupled to the player via a persistent connection.

10. The system of claim 1, wherein the player discards data germane to a said output device upon discontinuance of at least intermittent coupling with that device.

11. The system of claim 1, wherein
the first one of the plurality of players is at least intermittently coupled to the server and to a set of output devices,
wherein the first player discards data germane to each of a subset of said output devices upon discontinuance of at least intermittent coupling with that device, and wherein a second one of the players which comes into contact with a said player in that subset responds to a context of that output device by:
   i) obtaining from the server data germane to that context,
   ii) storing that data or content germane to that context generated from that data,
   iii) rendering that data or content to a form suitable for display on that output device, and
   iv) driving that rendered data or content to that output device for presentation thereon, wherein the player concurrently drives different rendered data or content to at least two of said output devices.

12. The system of claim 11, wherein the set of output devices comprises a plurality of electronic shelf labels.

13. The system of claim 12, wherein the set of output devices additionally comprises any of personal digital assistants, mobile phones, and LCD, LED or other fixed displays.

14. The system of claim 12, wherein the subset of output devices comprises a plurality of electronic shelf labels.

15. The system of claim 14, wherein the subset of output devices additionally comprises any of personal digital assistants, mobile phones, and LCD, LED or other fixed displays.

16. The system of claim 1, wherein rendering includes converting data or content from a first format in which it is received from the server to a second format suitable for display on that output device.

17. A system for display of context-aware content, comprising:
A. a server that stores context-sensitive data,
B. a plurality of players that is are at least intermittently coupled to the server and to a plurality of output devices, each said output device having a respective context, each said player being equipped to (i) obtain from the server and store data germane to respective contexts of the output devices to which that player is coupled, (ii) render that obtained data to a form suitable for display on one or more of those output devices, and (iii) drive that obtained data to one or more of the output devices directly or indirectly through one or more other players,
C. a first such player that is at least intermittently coupled to the server and to a set of output devices at a first time, the first player responding to a first context of a first output device to which it is at least intermittently coupled by obtaining from the server first data or content germane to the first context, storing the first data or content germane to the first context generated from the first data, rendering the first data or content to a form suitable for display on the first output device, and driving that rendered data or content to the first output device for presentation thereon, wherein the first player responds to a second context of a second output device to which it is at least intermittently coupled by obtaining from the server second data or content germane to the second context, storing the second data or content germane to the second context generated from the second data, and driving the second data or content to the second output device via one or more others of the plurality of players concurrently with driving rendered data or content to the first output device, wherein the first data or content differs from the second data or content, and wherein the first player discards data germane to a said output device upon discontinuance of at least intermittent coupling with that device,
D. second such player that is at least intermittently coupled with a subset of the output devices at a second time subsequent to the first time and that is at least intermittently coupled to the server, the second player responding to a context of each of the output devices to which it is at least intermittently coupled by obtaining from the server data germane to those contexts, storing that data or content germane to those contexts generated from that data, optionally rendering that data or content to a form suitable for display on one or more of the subset of output devices, and driving that data or content or that rendered data or content to one or more of the subset of output devices for presentation thereon, wherein the second player concurrently drives different data or content to at least two of said subset of output devices to which it is at least intermittently coupled, and wherein the second player discards data germane to a said output device upon discontinuance of at least intermittent coupling with that device.

18. The system of claim 17, wherein the set of output devices comprises a plurality of electronic shelf labels.

19. The system of claim 18, wherein the set of output devices additionally comprises any of personal digital assistants, mobile phones, and LCD, LED or other fixed displays.

20. The system of claim 18, wherein the subset of output devices comprises a plurality of electronic shelf labels.

21. The system of claim 20, wherein the subset of output devices additionally comprises any of personal digital assistants, mobile phones, and LCD, LED or other fixed displays.

22. The system of claim 17, wherein rendering includes converting data or content from a first format in which it is received from the server to a second format suitable for display on that output device.

23. A method for display of context-aware content, comprising:
   A. transmitting from a player digital data device to a server digital data device respective contexts of at least two output devices, each of which is at least intermittently coupled to the player digital data device,
   B. transmitting from the server digital data device to the player digital data device content for each of the output devices, where that content is selected based on the context of the respective output device,
   C. rendering on the player digital data device first content selected based on the context of a first output device and transmitting that rendered content to the first output device for presentation thereon,
   D. transmitting second content selected based on the context of a second output device to the second output device via one or more other player digital data devices and rendering that second content on one of the one or more other player digital data devices for presentation on the second output device,
   wherein different rendered content is presented on at least two of the output devices at the same time.

24. The method of claim 23, further comprising storing on the player digital data device content received from the server digital data device for each of the output devices.

25. The method of claim 23, wherein step (B) includes matching the output devices contexts against rules to select content to be transmitted to the player digital data device for rendering on the output devices.

26. The method of claim 23, further comprising discarding data germane to a said output device upon discontinuance of at least intermittent coupling between it and the player digital device.

27. The method of claim 23, wherein step (C) includes converting data or content from a first format in which it is received from the server digital data device to a second format suitable for display on that output device.

* * * * *